Sept. 9, 1941. A. K. KNÄLMANN 2,255,387
HARVESTER
Filed April 13, 1940   3 Sheets-Sheet 2
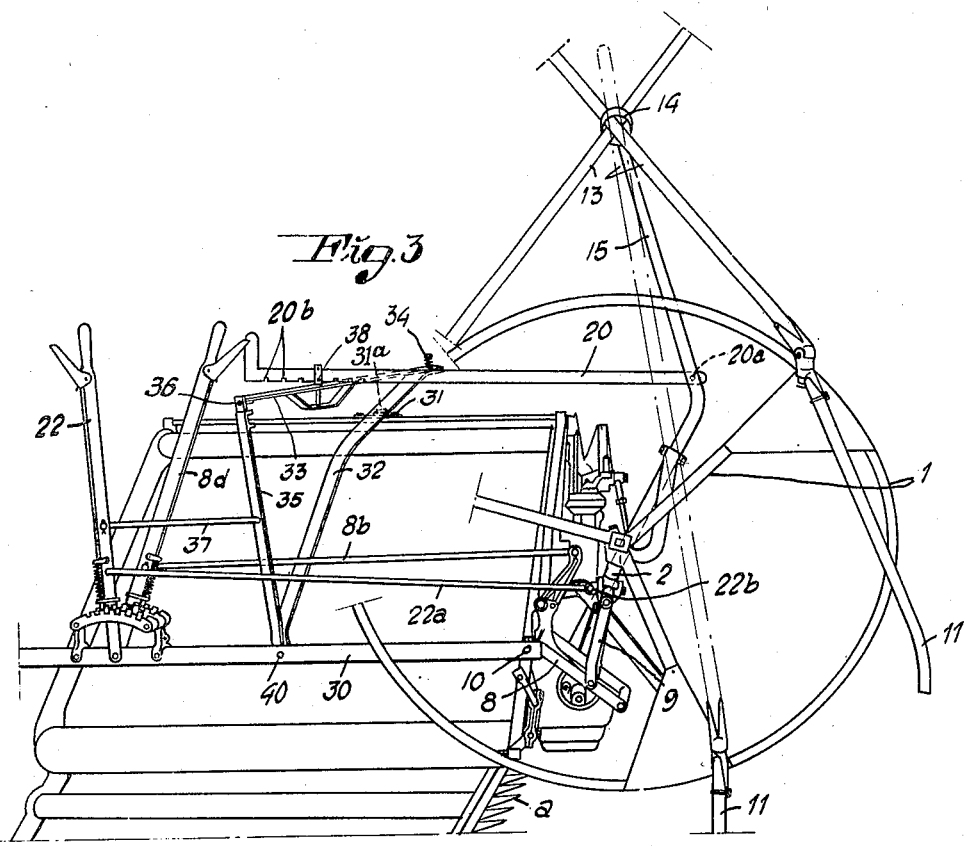
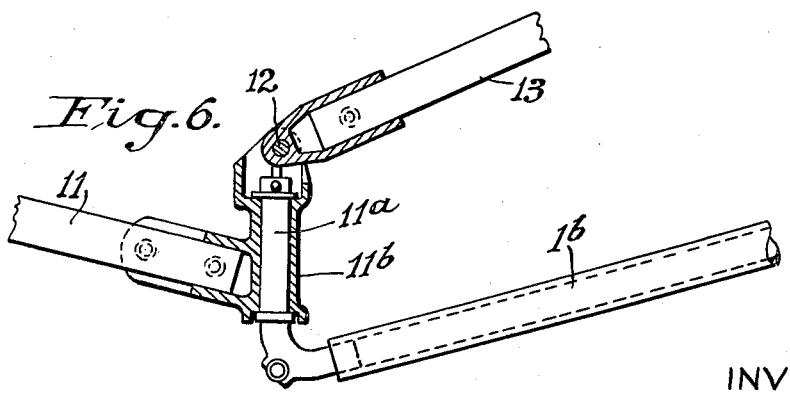
INVENTOR:
ALWIN KLEMENS KNÄLMANN
BY Haseltine, Lake & Co
ATTORNEYS Sept. 9, 1941.　　　A. K. KNÄLMANN　　　2,255,387
HARVESTER
Filed April 13, 1940　　　3 Sheets-Sheet 3
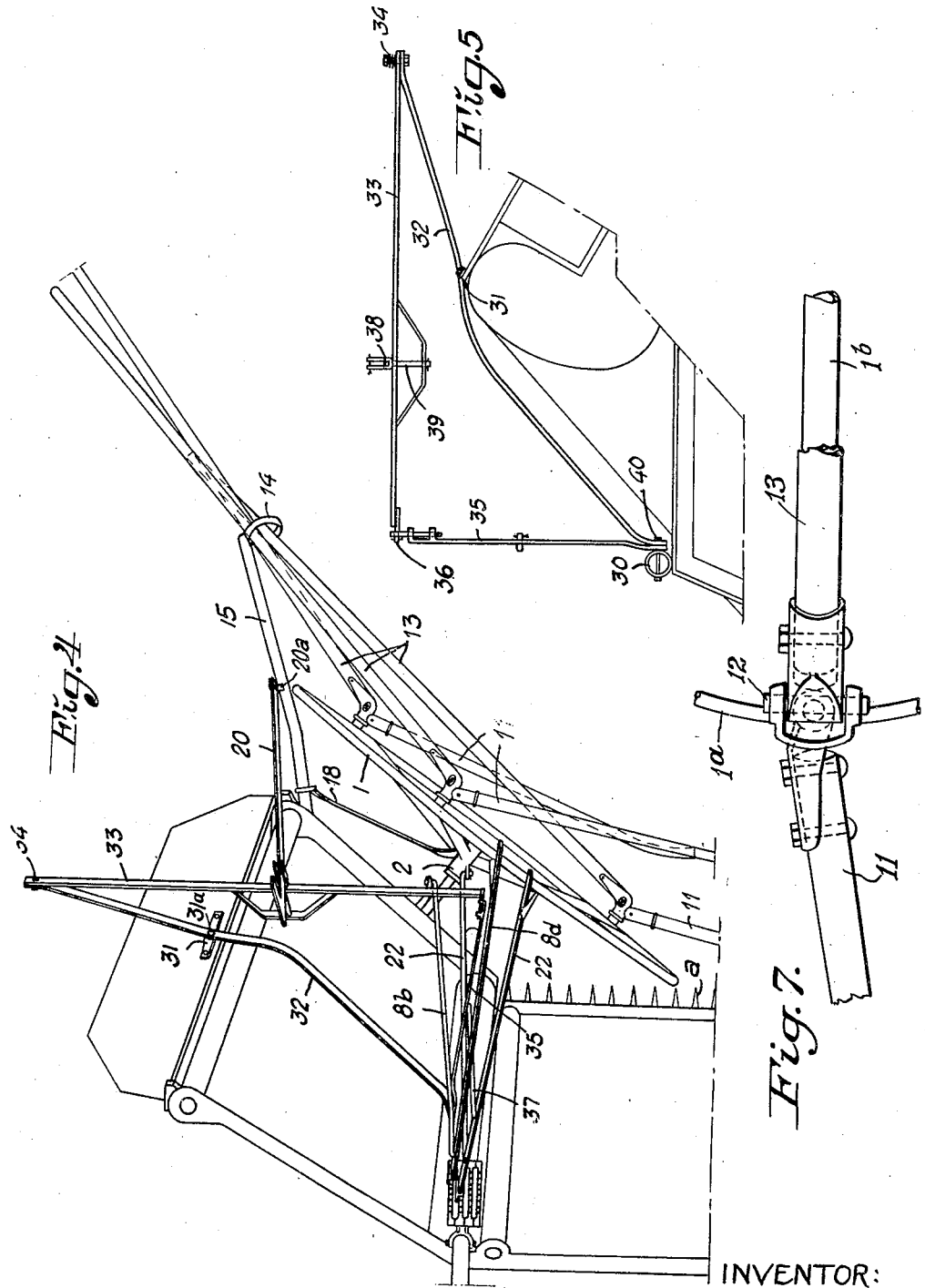
INVENTOR:
ALWIN KLEMENS KNÄLMANN
BY Haseltine, Lake & Co. ATTORNEYS Patented Sept. 9, 1941

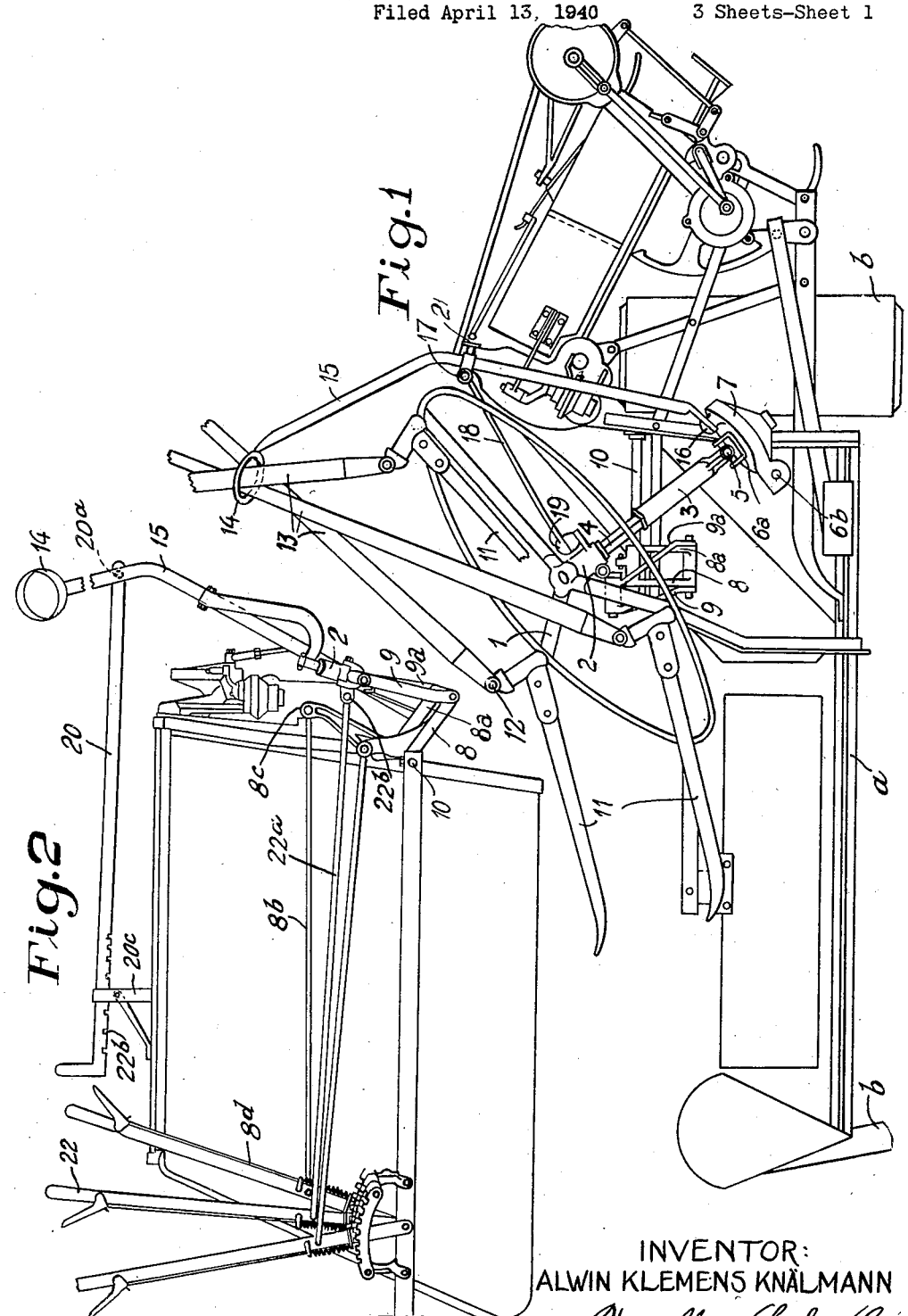

2,255,387

UNITED STATES PATENT OFFICE 2,255,387

HARVESTER

Alwin Klemens Knälmann, Morgongava, Sweden, assignor to Aktiebolaget Westeråsmaskiner, Morgongava, Sweden, a corporation of Sweden Application April 13, 1940, Serial No. 329,403
In Sweden February 7, 1939

4 Claims. (Cl. 56—167)

The present invention relates to sheafing and binding machines of the kind provided with a ring frame type sweep gatherer or a gatherer, the effective parts of which comprise bars arranged to seize and retain the crop in the desired position relative to the cutting apparatus of the machine.

During the movement of the working bars they are controlled by other bars—the guide bars, which are duly guided in a common guide ring arranged on a support. In order that the movement of the working bars can be adapted to the different conditions encountered, such as are determined by the more or less inclined or recumbent position of the crops or their inclined position relatively to the direction in which the machine is travelling etc., the sweep gatherer carrying the bars may be adjusted in a direction both up and down and to and fro in relation to the cutting apparatus of the sheafing and binding machine, and if necessary also laterally.

As the working movements of the working bars are also dependent on the position of the guide ring relatively to the sweep gatherer, and the relative position of these parts, especially in the adjustment of the cross bar in a forward or backward direction, can vary to a considerable and undesirable extent, it has hitherto been necessary on the known devices to make a separate adjustment in respect of the sweep gatherer and also a separate adjustment in regard to the guide ring. Since every such adjustment takes a certain amount of time to perform, the machine has not been as readily adaptable to the varying position of the crops in different parts of the field as could have been desired.

The present invention has for its primary object to obviate this disadvantage.

In order that the invention may more readily be understood reference is directed to the accompanying drawings showing one embodiment thereof. In the drawings—

Fig. 1 represents a front elevation of a sheafing and binding machine provided with a frame gatherer of the rotary ring frame type;

Fig. 2 shows a known type of adjusting device for the sweep gatherer and the guide ring support, viewed from the left in Fig. 1;

Fig. 3 shows in perspective, viewed at an angle from above, the sweep gatherer and an adjusting device designed according to the invention;

Fig. 4 shows an arrangement identical with that in Fig. 3 viewed at the rear, from above; and Fig. 5 illustrates in front elevation the connecting arrangement between the re-adjusting members of the sweep gatherer and the guide ring support.

Fig. 6 is an enlarged view of detail showing in partial section a pivotal connection of the adjusting members to the sweep gatherer involved.

Fig. 7 is a top plan view of the same.

Throughout the views, the same references indicate the same or like parts.

Referring particularly to Figs. 1 and 2 of the drawings, $a$ designates the cutting apparatus and $b$ the supporting wheels of the machine. 1 indicates the ring frame of the sweep gatherer which is rotatably mounted in a bearing socket 2 and driven by a shaft 4 which can move up and down in a sleeve 3. This sleeve 3 is connected by a universal joint 5 to part 6a of a gear wheel projecting out of the gear box 7 fixed to the machine frame, and the primary driving shaft of which is indicated by 6b.

The adjustments for raising and lowering the sweep gatherer are effected over a toggle device comprising the pairs of arms 8, 8a; 9, 9a, the first pair being pivotally mounted and displaceable on a shaft 10, whilst the other pair 9, 9a is articulated to and supports the bearing socket 2 of the sweep gatherer. The arms 8 are rigidly connected to an arm 8c, Fig. 2, joined to one end of a link rod 8b which is duly connected at the other end to an adjusting hand lever 8d.

The adjustment of the sweep gatherer in a backward or forward direction relatively to the cutting apparatus $a$ is effected by means of a hand lever 22 connected to one end of a re-adjusting rod 22a, which is articulated at its other end 22b to the bearing socket 2 of the sweep gatherer.

The working bars designated by 11 are pivotally connected to the sweep gatherer and articulated at 12 to the bars 13 (Figs. 6 and 7) which pass through and are guided by the guide ring 14 carried by the ring support 15. In the embodiment described this support 15 is shown as being joined at one end to the gear box 7 by a ball-and-socket joint 16 and also attached by a ball-and-socket joint 19 to the bearing socket 2 of the sweep gatherer over a bar 18 articulated at 17. Reference 1a in Fig. 6 indicates the ring of the sweep gatherer which is connected to the bearing socket 2 by means of spokes 1b. Each spoke is provided with a pin 11a on which a sleeve 11b is pivotally mounted which is secured to the bar 11. The pivotal connection between the sleeve 11b and the bar 13 is indicated at 12. This arrangement renders it possible for the guide ring to receive automatically the desired adjustment relative to the centre of the sweep gatherer upon the readjustment of the sweep gatherer.

The angle of contact of the working bars, that is to say the angle which they form with the longitudinal plane of the cutting apparatus $a$ on contact with the crops is dependent on the position of the guide ring relatively to the sweep gatherer considered in the direction in which the machine is driven. In known arrangements the adjustment of the guide ring into this relative position is effected by means of an adjusting rod 20, Fig. 2, which is articulated at 20a to the guide ring support 15. The rod 20 is provided with a number of stop notches 20b which engage a corresponding stop device on a part 20c fixed to the machine frame.

In Figs. 3 to 5 is illustrated one embodiment of the connection provided according to the invention between the guide ring support 15 and the re-adjusting members 22, 22a for the adjustment of the sweep gatherer either forwards or backwards relatively to the cutting apparatus $a$. To the parts 30 and 31, which are fixed relatively to the machine frame, is connected as for example, by bolts 31a a supporting arm 32, the outer end of which is articulated by a spring-loaded pin 34 to one end of an arm 33 extending at an angle, suitably about right angles above or below the adjusting rod 20 of the guide ring. The arm 33 is supported at its outer free end, which is just about central with the hand lever 22, by a supporting link 35 through an articulating joint 36. The supporting link 35 is connected to the hand lever 22 by a link 37 and at its lower end is pivotally mounted on a pin 40.

A stop device 38 for the adjusting rod 20 of the guide ring and pivotally mounted at 39, is provided on the arm 33.

The pivot 34 of the arm 33 should be disposed at such a distance from the stop device 38 that any excessive bending movements tending to bring about buckling of the various articulated joints of the system are avoided. The margin of free movement of all the articulations is, however, sufficiently ample to make allowance for such buckling to a certain extent.

It will readily be understood that the arrangement described renders it possible to adjust the sweep gatherer backwards or forwards relatively to the cutting apparatus, whilst at the same time retaining a substantially unaltered angle of contact, in accordance with the above definition, for the working bars, such adjustment being effected solely by means of the hand lever 22. By the provision of the stop device 38, however, the angle of contact can be continuously varied at any time, as and when required. It is likewise obvious that the invention can also be applied to such sheafing and binding machines of known design as make use of the guide ring support arranged independently of the sweep gatherer, that is without the articulated connection 16, 19 to this gatherer, and supported independently on the machine instead.

It will be appreciated that the present invention is by no means limited to the embodiment as illustrated and described, but is capable of any suitable variation or adaptation falling within the scope of the appended claims construed as broadly as is consistent with the prior art.

What I claim is:

1. In a sheafing and binding machine, a cutting apparatus, a rotary frame sweep gatherer, adjusting members for displacing said gatherer forward or backward relative to said cutting apparatus, a guide ring, a guide ring support pivotally connected to said gatherer, and connecting means operatively connecting said adjusting members to said support.

2. In a sheafing and binding machine, a cutting apparatus, a rotary frame sweep gatherer, an adjusting rod for displacing said gatherer forward or backward relative to said cutting apparatus, an adjusting lever for actuating said adjusting rod, a guide ring, a guide ring support pivotally connected to said gatherer, an adjusting rod for said support, and an adjustable link device interconnecting said adjusting rods.

3. In a sheafing and binding machine, a cutting apparatus, a rotary frame sweep gatherer, an adjusting rod for displacing said gatherer forward or backward relative to said cutting apparatus, an adjusting lever for actuating said adjusting rod, a guide ring, a guide ring support pivotally connected to said gatherer, an adjusting rod for said support, and an adjustable link device interconnecting said adjusting rods, said link device comprising an arm disposed at substantially right angles to said adjusting rod for said support, and a locking device for said last-named adjusting rod, one end of said arm being pivotally connected to a part stationary relative to said machine.

4. In a sheafing and binding machine, a cutting apparatus, a rotary frame sweep gatherer, an adjusting rod for displacing said gatherer forward or backward relative to said cutting apparatus, an adjusting lever for actuating said adjusting rod, a guide ring, a guide ring support pivotally connected to said gatherer, an adjusting rod for said support, and an adjustable link device interconnecting said adjusting rods, said link device comprising an arm disposed at substantially right angles to said adjusting rod for said support, a locking device carried by said arm, a supporting link pivotally mounted on said machine and located substantially opposite said adjusting lever, and a link connecting said adjusting lever to said supporting link, said arm being articulated at its outer free end to said supporting link.

ALWIN KLEMENS KNÄLMANN.